United States Patent
Lee et al.

(10) Patent No.: US 10,578,873 B2
(45) Date of Patent: Mar. 3, 2020

(54) HEAD MOUNTED DISPLAY

(71) Applicant: LG Display Co., Ltd., Seoul (KR)

(72) Inventors: Keongjin Lee, Seoul (KR); SungMin Jung, Seoul (KR); HanSeok Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 44 days.

(21) Appl. No.: 15/849,330

(22) Filed: Dec. 20, 2017

(65) Prior Publication Data

US 2018/0180889 A1    Jun. 28, 2018

(30) Foreign Application Priority Data

Dec. 26, 2016 (KR) .................. 10-2016-0178733

(51) Int. Cl.
  *G02B 27/01*     (2006.01)
  *G02F 1/1335*    (2006.01)
  *G02B 27/28*     (2006.01)

(52) U.S. Cl.
  CPC ....... *G02B 27/0172* (2013.01); *G02B 27/286* (2013.01); *G02F 1/133526* (2013.01); *G02F 1/133528* (2013.01); *G02F 1/133536* (2013.01); *G02B 2027/0178* (2013.01)

(58) Field of Classification Search
  None
  See application file for complete search history.

(56) References Cited

U.S. PATENT DOCUMENTS

| | | | |
|---|---|---|---|
| 5,715,023 A | 2/1998 | Hoppe | |
| 6,075,651 A | 6/2000 | Hoppe | |
| 6,094,242 A * | 7/2000 | Yamanaka | G02B 5/3016 349/115 |
| 6,400,493 B1 | 6/2002 | Mertz et al. | |
| 6,421,183 B1 | 7/2002 | Ophey | |

(Continued)

FOREIGN PATENT DOCUMENTS

| | | |
|---|---|---|
| CN | 1930511 A | 3/2007 |
| CN | 105229514 A | 1/2016 |

(Continued)

OTHER PUBLICATIONS

Office Action dated Dec. 5, 2019 issued in corresponding Chinese Application No. 201711373045.3 (23 pages).

*Primary Examiner* — Kenneth B Lee, Jr.
(74) *Attorney, Agent, or Firm* — Polsinelli PC

(57) ABSTRACT

A head mounted display of which thickness may be reduced is disclosed. The head mounted display comprises a lens, and a display module accommodating unit for providing an image to the lens. The display module accommodating unit includes a display module for displaying an image, a first quarter wave ($\lambda/4$) plate arranged between the display module and the lens, delaying a phase of incident light as much as $\lambda/4$, a second quarter wave plate arranged between the first quarter wave plate and the lens, delaying a phase of incident light as much as $\lambda/4$, a reflective polarizing plate arranged between the second quarter wave plate and the lens, passing through first linear polarized light and reflecting second linear polarized light crossing the first linear polarized light, and a semi-transmissive plate arranged between the first quarter wave plate and the second quarter wave plate.

22 Claims, 7 Drawing Sheets

(56) References Cited

U.S. PATENT DOCUMENTS

| | | | |
|---|---|---|---|
| 10,007,035 B2 | 6/2018 | Ouderkirk et al. | |
| 10,203,489 B2 * | 2/2019 | Khan | G02B 17/0856 |
| 2001/0028332 A1 | 10/2001 | Roest | |
| 2002/0024743 A1 | 2/2002 | Endo et al. | |
| 2007/0070508 A1 | 3/2007 | Ruhle et al. | |
| 2014/0211322 A1 | 7/2014 | Bohn et al. | |
| 2017/0017077 A1 | 1/2017 | Tang et al. | |
| 2018/0101020 A1 * | 4/2018 | Gollier | G02B 27/283 |

FOREIGN PATENT DOCUMENTS

| | | |
|---|---|---|
| CN | 105929537 A | 9/2016 |
| EP | 0 718 645 A2 | 6/1996 |
| JP | 2001-356295 A | 12/2001 |
| JP | 2005-148655 A | 6/2005 |
| JP | 2007-512581 A | 5/2007 |
| KR | 20090053316 A | 5/2009 |
| KR | 101370050 B1 | 3/2014 |
| WO | 2011/066890 A2 | 6/2011 |

\* cited by examiner

HEAD MOUNTED DISPLAY

CROSS REFERENCE TO RELATED APPLICATION

This application claims the benefit of the Korean Patent Application No. 10-2016-0178733 filed on Dec. 26, 2016, which is hereby incorporated by reference in its entirety for all purposes as if fully set forth herein.

BACKGROUND

Field of the Disclosure

The present disclosure relates to a display device, and more particularly, to a head mounted display.

Description of the Background

A head mounted display (HMD) is an image display device that can be worn on a head of a user in the form of glasses or helmet and forms a focus at a distance close to eyes of the user. The head mounted display may realize virtual reality (VR) or augmented reality (AR).

FIG. 1 is an exemplary view illustrating implementation of a virtual image of a head mounted display. Referring to FIG. 1, the head mounted display may include a lens where eyes of a user are located and a display module for displaying an image. The head mounted display arranges the lens between the display module and the eyes of the user to allow the user to view a virtual image through the lens when an image 'dis' of the display module is displayed, and arranges the display module within a focal distance 'f' of the lens. At this time, a display position S2 of a virtual image 'vi' may be determined depending on a distance S1 between the lens and the display module. The focal distance 'f' of the lens, a distance S1 between the lens and the display module, and a distance S2 between the eyes of the user and the display position of the virtual image 'vi' may be set as expressed by the following Equation 1.

$$\frac{1}{f} = \frac{1}{S1} + \frac{1}{S2} \qquad \text{[Equation 1]}$$

Referring to Equation 1, the distance S2 between eyes of the user and the display position of the virtual image 'vi' may be varied depending on the focal distance of the lens and the distance S1 between the lens and the display module. Since the distance S2 between the eyes of the user and the display position of the virtual image 'vi' becomes long if the distance S1 between the lens and the display module becomes short, the size of the virtual image 'vi' becomes great. For this reason, if the size of the virtual image 'vi' becomes too great, a black matrix of the display module is enlarged, whereby a problem occurs in that the black matrix is seen as a lattice shape. Therefore, to solve this problem, the lens and the display module are spaced apart from each other at a predetermined distance within the focal distance 'f' of the lens.

Meanwhile, the head mounted display has been recently manufactured to have a thin thickness to allow a user to easily carry it. However, since the lens and the display module should be spaced apart from each other at a predetermined distance, it is difficult to reduce the thickness of the head mounted display.

SUMMARY

Accordingly, the present disclosure is directed to a head mounted display that substantially obviates one or more problems due to limitations and disadvantages of the prior art.

The present disclosure is to provide a head mounted display of which thickness can be reduced.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a head mounted display comprising a lens, and a display module accommodating unit for providing an image to the lens. The display module accommodating unit includes a display module for displaying an image, a first quarter wave ($\lambda/4$) plate arranged between the display module and the lens, delaying a phase of incident light as much as $\lambda/4$, a second quarter wave plate arranged between the first quarter wave plate and the lens, delaying a phase of incident light as much as $\lambda/4$, a reflective polarizing plate arranged between the second quarter wave plate and the lens, passing through first linear polarized light and reflecting second linear polarized light crossing the first linear polarized light, and a semi-transmissive plate arranged between the first quarter wave plate and the second quarter wave plate.

In another aspect of the present disclosure, a head mounted display device having a pair of lenses and a display module accommodating unit providing an image to the pair of lenses comprise a display module displaying an image and outputting first linear polarized light; a first quarter wave plate converting the first linear polarized light to first circular polarized light; a semi-transmissive plate passing through the first circular polarized light and partially reflecting second circular polarized light; a second quarter wave plate converting the first circular polarized light to second linear polarized light, converting the second linear polarized light to the second circular polarized light, and converting the second circular polarized light to the first linear polarized light; and a reflective polarizing plate reflecting the second linear polarized light and passing through the first linear polarized light reaching to the pair of lenses.

In a further aspect of the present disclosure, a head mounted display device having a pair of lenses and a display module accommodating unit providing an image to the pair of lenses includes a display module for displaying an image and outputting first linear polarized light; a first quarter wave plate between the display module and the lens; a second quarter wave plate between the first quarter wave plate and the lens; a reflective polarizing plate between the second quarter wave plate and the lens, passing through first linear polarized light, and reflecting second linear polarized light crossing the first linear polarized light; and a semi-transmissive plate between the first quarter wave plate and the second quarter wave plate, wherein a distance between the display module and the first lens is a+b+c and an optical path length between the image displayed on the display module and the semi-transmissive plate is either a+2b or a+3b+c, where a is a distance the display module and the second quarter wave plate, b is a distance between the second quarter wave plate and the reflective polarizing plate, c is a distance between the reflective polarizing plate and the first lens, and a+2b or a+3b+c is greater than a+b+c.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure. In the drawings.

DETAILED DESCRIPTION

Figure 1:
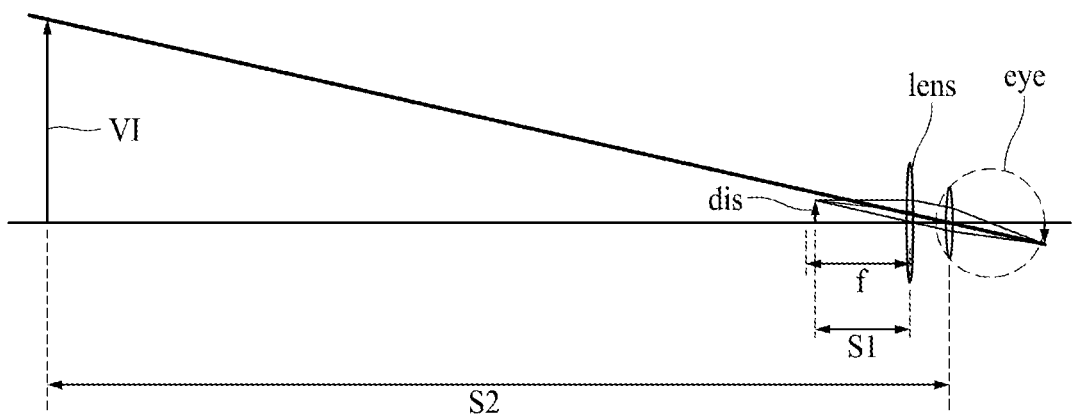
FIG. 1 is an exemplary view illustrating implementation of a virtual image of a head mounted display.

The same reference numbers substantially mean the same elements through the specification. In the following description of the present disclosure, if detailed description of elements or functions known in respect of the present disclosure is not relevant to the subject matter of the present disclosure, the detailed description will be omitted. The terms disclosed in this specification should be understood as follows.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~' a case which is not continuous may be included unless 'just' or 'direct' is used.

It will be understood that, although the terms "first", "second", etc. may be used herein to describe various elements, these elements should not be limited by these terms. These terms are only used to distinguish one element from another element. Therefore, a first element could be termed a second element, and, similarly, a second element could be termed a first element, without departing from the scope of the present disclosure.

"X-axis direction", "Y-axis direction" and "Z-axis direction" should not be construed by a geometric relation only of a mutual vertical relation, and may have broader directionality within the range that elements of the present disclosure may act functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, the preferred aspect of the present disclosure will be described in detail with reference to the accompanying drawings.

Figure 2A:
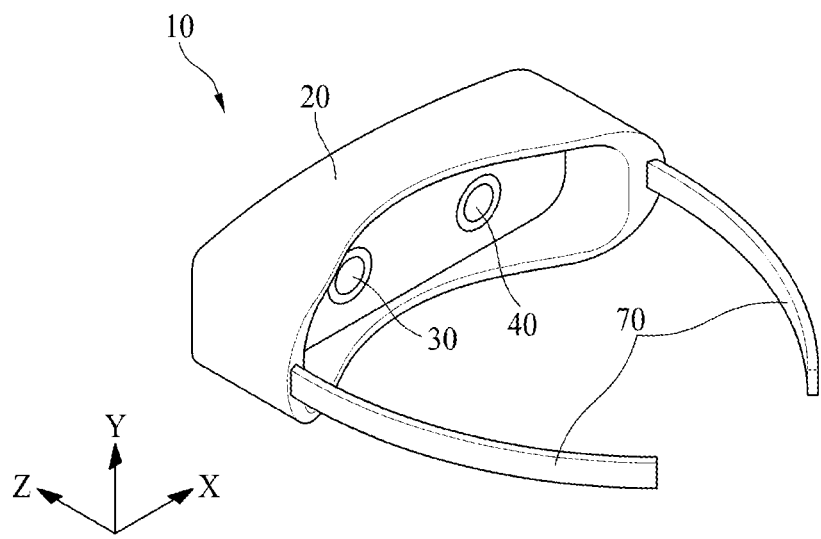
FIGS. 2A and 2B are perspective views illustrating a head mounted display according to an aspect of the present disclosure.
Figure 2B:
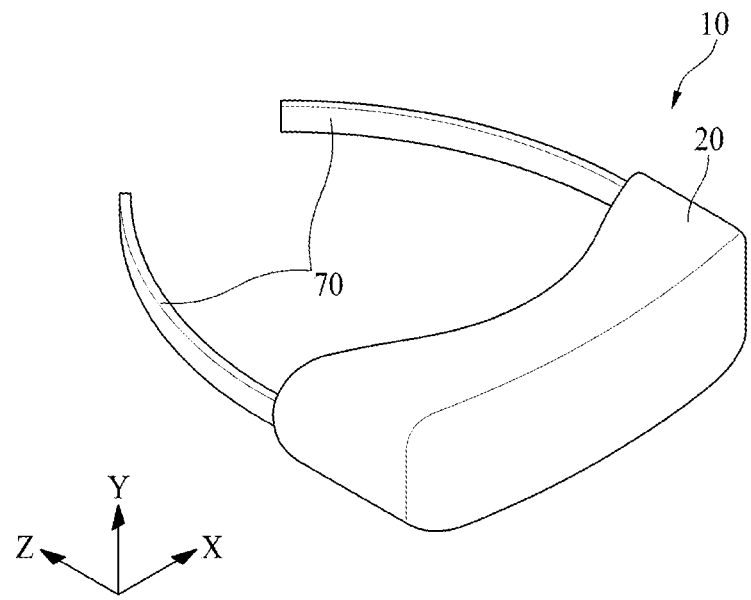

FIGS. 2A and 2B are perspective views illustrating a head mounted display according to an aspect of the present disclosure. FIG. 2A illustrates a rear surface of a display accommodating unit 20 of a head mounted display 10, and FIG. 2B illustrates a front surface of the display accommodating unit 20 of the head mounted display 10.

Referring to FIGS. 2A and 2B, the head mounted display 10 according to an aspect of the present disclosure comprises a display accommodating unit 20, a first lens 30, a second lens 40, and glasses frame bridges 70.

The head mounted display 10 according to an aspect of the present disclosure is realized as, but not limited to, a glasses type that includes glasses frame bridges 70 to allow a user to easily wear or take off it. That is, the head mounted display 10 may include a head mounted band that may be mounted on a head of a user, instead of the glasses frame bridges 70.

The display accommodating unit 20 includes a display module for displaying an image and an optical means for providing an image displayed on the display module to first and second lenses 30 and 40. A detailed description of the display accommodating unit 20 will be provided later with reference to FIGS. 3 and 8.

The first and second lenses 30 and 40 may be arranged on the rear surface of the display accommodating unit 20. The first lens 30 may be the left-eye lens where the left-eye of a user is located, and the second lens 40 may be the right-eye lens where the right-eye of a user is located. For this reason, the user may view an image displayed on the display module of the display module accommodating unit 20 through the first and second lenses 30 and 40.

According to the aspect of the present disclosure, the image displayed on the display module of the display module accommodating unit 20 may be provided to the user through the first and second lenses 30 and 40. As a result, according to the aspect of the present disclosure, a virtual image displayed by the display module of the display module accommodating unit 20 may be provided to the user. That is, in the aspect of the present disclosure, virtual reality (VR) may be realized.

Figure 3:
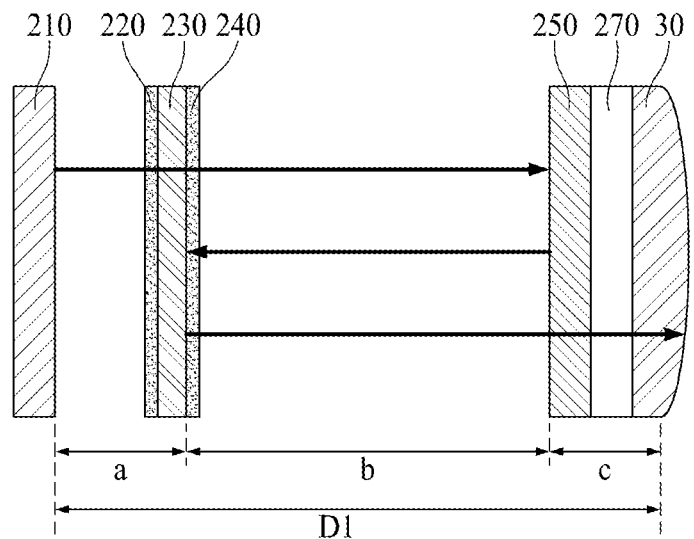
FIG. 3 is an exemplary view illustrating an example of a display module accommodating unit of FIGS. 2A and 2B.
Figure 4:
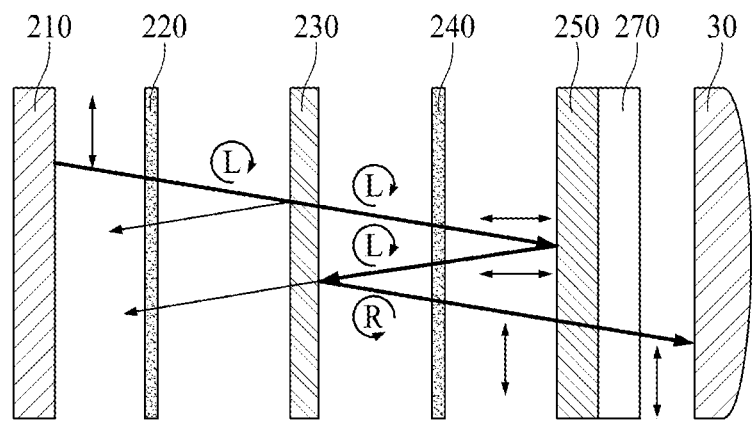
FIG. 4 is an exemplary view illustrating exploded elements of the display module accommodating unit of FIG. 3.

FIG. 3 is an exemplary view illustrating an example of a display module accommodating unit of FIGS. 2A and 2B. FIG. 4 is an exemplary view illustrating exploded elements of the display module accommodating unit of FIG. 3.

FIGS. 3 and 4 correspond to side views illustrating that the display module accommodating unit is viewed from one side. The first lens 30 and elements of the display module accommodating unit 20 for providing an image to the first lens 30 according to an aspect of the present disclosure are shown in FIGS. 3 and 4. Since the second lens 40 and elements of the display module accommodating unit 20 for providing an image to the second lens 40 according to an aspect of the present disclosure are substantially the same as those shown in FIGS. 3 and 4, their description will not be repeated.

Referring to FIGS. 3 and 4, the display module accommodating unit 20 includes a display module 210, a first quarter wave (λ/4) plate 220, a half mirror 230, a second quarter wave plate 240, a reflective polarizing plate 250, and a polarizing plate 270.

The display module 210 may be a display device that displays an image. For example, the display module 210 may be realized as a display device such as a liquid crystal display, an organic light emitting display device, LCoS (liquid crystal on silicon substrate, OLEDoS (organic light emitting device on silicon substrate), or LEDoS (light emitting diode on silicon substrate. Hereinafter, for convenience of description, the display module 210 is a liquid crystal display, but the aspect of the present disclosure is not limited to the liquid crystal display. A detailed description of the display module 210 will be provided later with reference to FIGS. 6 and 7.

The first quarter wave plate 220, the half mirror 230, the second quarter wave plate 240, and the reflective polarizing plate 250 may be arranged between the display module 210 and the first lens 30.

The first quarter wave plate 220 is arranged between the display module 210 and the half mirror 230. The first quarter wave plate 220 may be attached to one surface of the half mirror 230. The first quarter wave plate 220 delays a phase of incident light as much as λ/4.

The half mirror 230 is arranged between the first quarter wave plate 220 and the second quarter wave plate 240. The first quarter wave plate 220 may be attached to one surface of the half mirror 230 and the second quarter wave plate 240 may be attached to the other surface of the half mirror 230.

The half mirror 230 may be a semi-transmissive plate that transmits a part of light and reflects the other part of light. For example, the half mirror 230 may be a glass provided with a semi-transmissive conductive film formed on one surface. The semi-transmissive conductive film may be formed of a semi-transmissive conductive material such as Mg, Ag, or alloy of Mg and Ag.

The second quarter wave plate 240 is arranged between the half mirror 230 and the reflective polarizing plate 250. The second quarter wave plate 240 may be attached to the other surface of the half mirror 230. The second quarter wave plate 240 delays a phase of incident light as much as λ/4.

The reflective polarizing plate 250 is arranged between the second quarter wave plate 240 and the polarizing plate 270. The reflective polarizing plate 250 may be attached to one surface of the polarizing plate 270. The reflective polarizing plate 250 passes through first linear polarized light ↕ and reflects second linear polarized light ↔ crossing the first linear polarized light ↕. The first linear polarized light ↕ may be vertical polarized light vibrated in a vertical direction (y-axis direction), and the second linear polarized light ↔ may be horizontal polarized light vibrated in a horizontal direction (x-axis direction or z-axis direction). For example, the reflective polarizing plate 250 may be, but not limited to, an APF (advanced polarizing film) or DBEF (dual bright enhanced film).

The polarizing plate 270 is arranged between the reflective polarizing plate 250 and the first lens 30. The polarizing plate 270 may be attached to one surface of the first lens 30. The polarizing plate 270 passes through the first linear polarized light ↕ and shields the second linear polarized light ↔. The second linear polarized light ↔ leaked from the reflective polarizing plate 250 may be shielded by the polarizing plate 270.

The first lens 30 may be a convex lens or a Fresnel lens. Meanwhile, since the reflective polarizing plate 250 is attached to one surface of the first lens 30, one surface of the first lens 30 may be formed to be flat to facilitate attachment of the reflective polarizing plate 250. In this case, the convex lens or the Fresnel lens may be formed on the other surface of the first lens 30.

Figure 5:
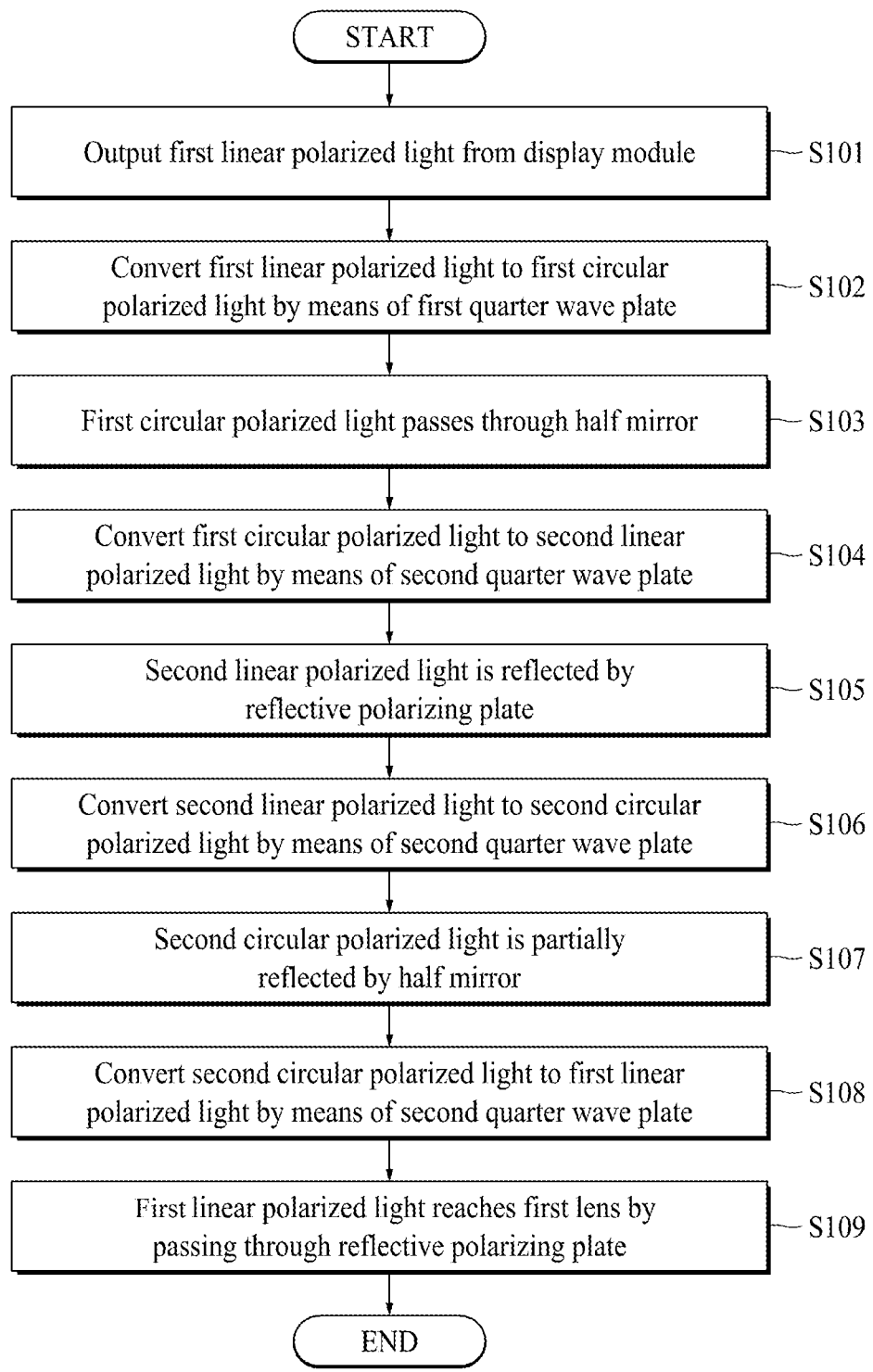
FIG. 5 is a flow chart illustrating a photo conversion procedure of the display module accommodating unit shown in FIG. 3.

FIG. 5 is a flow chart illustrating a photo conversion procedure of the display module accommodating unit shown in FIG. 3. The photo conversion procedure of the display module accommodating unit 20 will be described in detail with reference to FIGS. 4 and 5. Particularly, since the photo conversion procedure of the display module accommodating unit 20 is based on polarizing characteristic of light, the photo conversion procedure will be described based on the polarizing characteristic of light.

First, the first linear polarized light ↕ may be output from the display module 210. In FIGS. 2 and 3, it has been described that the first linear polarized light ↕ is vertical polarized light vibrated in a vertical direction (y-axis direction). The first linear light ↕ output from the display module 210 is headed for the first quarter wave plate 220. (S101 of FIG. 5)

Secondly, since the phase of the first linear polarized light ↕ output from the display module 210 is delayed by the first quarter wave plate 220 as much as λ/4, the first linear polarized light ↕ is converted to the first circular polarized light L. In FIGS. 2 and 3, it has been described that the first circular polarized light L is left circular polarized light. The first circular polarized light L converted by the first quarter wave plate 220 is headed for the half mirror 230. (S102 of FIG. 5)

Thirdly, since the half mirror 230 may transmit a part of light and reflect another part of light, the first circular polarized light L converted by the first quarter wave plate 220 partially passes through the half mirror 230. The first circular polarized light L that has passed through the half mirror 230 is headed for the second quarter wave plate 240. (S103 of FIG. 5)

Fourthly, since the phase of the first circular polarized light L that has passed through the half mirror 230 is delayed by the second quarter wave plate 240 as much as λ/4, the first circular polarized light L is converted to the second linear polarized light ↔. In FIGS. 2 and 3, it has been described that the second linear polarized light ↔ is horizontal polarized light vibrated in a horizontal direction (x-axis direction or z-axis direction). The second linear polarized light ↔ converted by the second quarter wave plate 240 is headed for the reflective polarizing plate 250. (S104 of FIG. 5)

Fifthly, since the reflective polarizing plate 250 passes through the first linear polarized light ↕ and reflects the second linear polarized light ↔, the second linear polarized light ↔ converted by the second quarter wave plate 240 is reflected by the reflective polarizing plate 250. Also, the second linear polarized light ↔ leaked from the reflective polarizing plate 250 without being reflected by the reflective polarizing plate 250 may be shielded by the polarizing plate 270. The second linear polarized light ↔ reflected by the reflective polarizing plate 250 is headed for the second quarter wave plate 240. (S105 of FIG. 5)

Sixthly, since the phase of the second linear polarized light ↔ reflected by the reflective polarizing plate 250 is delayed by the second quarter wave plate 240 as much as λ/4, the second linear polarized light ↔ is converted to the second circular polarized light R. In FIGS. 2 and 3, it has been described that the second circular polarized light R is right circular polarized light. The second circular polarized light R converted by the second quarter wave plate 240 is headed for the half mirror 230. (S106 of FIG. 5)

Seventhly, since the half mirror 230 may transmit a part of light and reflect another part of light, the second circular polarized light R converted by the second quarter wave plate 240 is partially reflected by the half mirror 230. The second circular polarized light R reflected by the half mirror 230 is headed for the second quarter wave plate 240. (S107 of FIG. 5)

Eighthly, since the phase of the second circular polarized light R reflected by the half mirror 230 is delayed by the second quarter wave plate 240 as much as λ/4, the second circular polarized light R is converted to the first linear polarized light ↕. The first linear polarized light ↕ converted by the second quarter wave plate 240 is headed for the reflective polarizing plate 250. (S108 of FIG. 5)

Ninthly, since the reflective polarizing plate 250 passes through the first linear polarized light ↕ and reflects the second linear polarized light ↔, the first linear polarized light ↕ converted by the second quarter wave plate 240 passes through the reflective polarizing plate 250. Also, since the polarizing plate 270 passes through the first linear polarized light ↕ and shields the second linear polarized light ↔, the first linear polarized light ↕ converted by the second quarter wave plate 240 passes through the polarizing plate 270. The first linear polarized light ↕ that has passed through the reflective polarizing plate 250 and the polarizing plate 270 may reach the first lens 30. Therefore, a user may view an image of the display module 210 through the first lens. (S109 of FIG. 5)

Supposing that the distance between the display module 210 and the second quarter wave plate 240 is "a", the distance between the second quarter wave plate 240 and the reflective polarizing plate 250 is "b" and the distance between the reflective polarizing plate 250 and the first lens 30 is "c", the distance from the display module 210 to the first lens 30 corresponds to "a+b+c" but a light path length until the image displayed on the display module 210 reaches the first lens 30 having a predetermined focal distance may correspond to "a+3b+c". At this time, the distance from the display module 210 to the first lens 30 may be defined as a thickness D1 of the display module accommodating unit 20. That is, in the aspect of the present disclosure, the light path length until the image displayed on the display module 210 reaches the first lens 30 having a predetermined focal distance may be longer than the thickness D1 of the display module accommodating unit 20. As a result, in the aspect of the present disclosure, even though the thickness D1 of the display module accommodating unit 20 is reduced, the light path length until the image displayed on the display module 210 reaches the first lens 30 may be maintained as it is. Therefore, in the aspect of the present disclosure, the thickness D1 of the display module accommodating unit 20 may be reduced, whereby the thickness of the head mounted display may be reduced.

Figure 6:
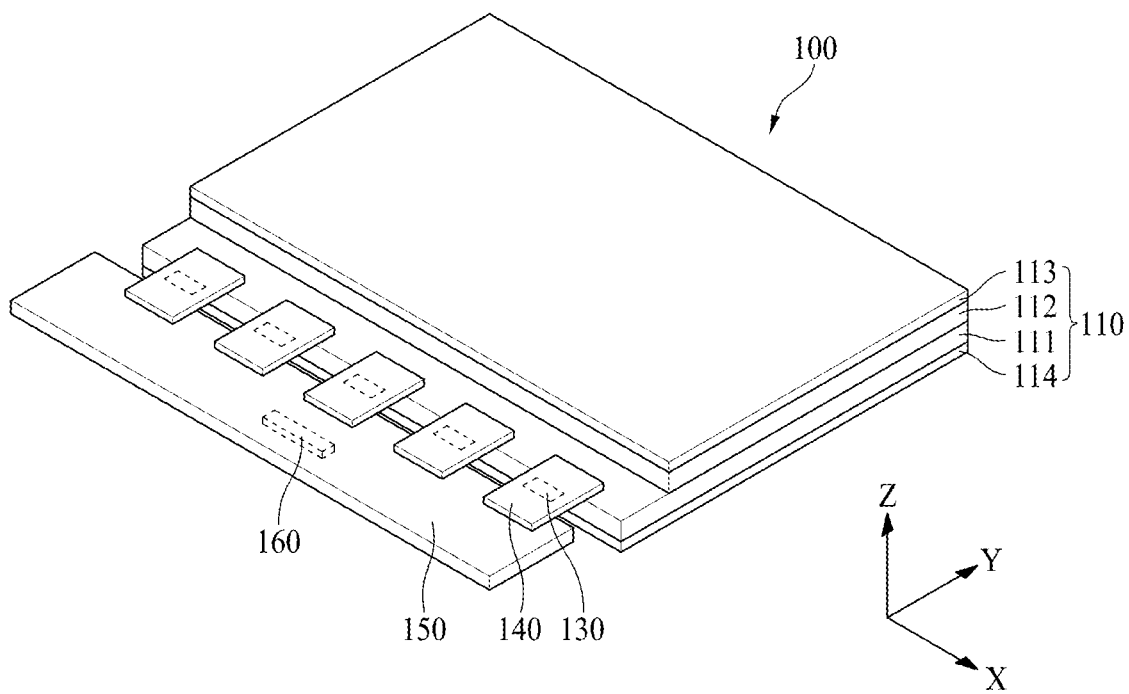
FIG. 6 is an exemplary view illustrating the display module of FIG. 2.
Figure 7:
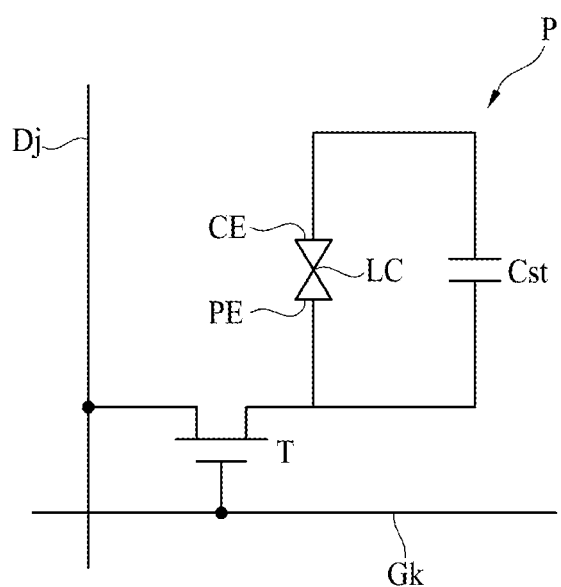
FIG. 7 is a circuit diagram illustrating a pixel of a display panel of FIG. 6.

FIG. 6 is an exemplary view illustrating the display module of FIG. 2. FIG. 7 is a circuit diagram illustrating a pixel of a display panel of FIG. 6.

Hereinafter, the display module 210 will be described in detail with reference to FIGS. 6 and 7.

Referring to FIGS. 6 and 7, the display module 210 includes a display panel 110, a source drive integrated circuit ("IC") 130, a flexible film 140, a circuit board 150, a timing controller 160 and a backlight unit.

The display panel 110 includes an upper substrate 112, a lower substrate 111, and a liquid crystal layer formed between the lower and upper substrates. Data lines and gate lines are arranged on the lower substrate of the display panel 110 to cross each other. Pixels P are arranged on the display panel 110 by a crossing structure of the data lines and the gate lines in a matrix arrangement. Each of the pixels P may be connected to any one of the data lines and any one of the gate lines. For this reason, the pixel P is supplied with a data voltage of the data line when a gate signal is supplied to the gate line, and emits light at a predetermined brightness in accordance with the supplied data voltage.

For example, each of the pixels P may include a transistor T, a pixel electrode PE, a common electrode CE, and a storage capacitor Cst as shown in FIG. 6. The transistor T may be a thin film transistor formed by a semiconductor process. The transistor T supplies a data voltage of the jth data line Dj (j is a positive integer) to the pixel electrode PE in response to a gate signal of the kth gate line Gk (k is a positive integer). For this reason, each of the pixels P may control transmittance of light incident from the backlight unit by driving liquid crystals of the liquid crystal layer LC through an electric field generated by a potential difference between the data voltage supplied to the pixel electrode PE and a common voltage supplied to the common electrode CE. The common electrode CE is supplied with the common voltage from a common line CL. Also, the storage capacitor Cst is provided between the pixel electrode PE and the common electrode CE, and uniformly maintains the potential difference between the pixel electrode PE and the common electrode CE.

A black matrix and color filters may be formed on the upper substrate 112 of the display panel 110. If the liquid crystal display device is formed in a color filter on TFT (COT) array, the black matrix and the color filters may be formed on the lower substrate 111.

The common electrode CE may be formed on the upper substrate 112 in a vertical electric field driving mode such as a twisted nematic (TN) mode and a vertical alignment (VA) mode, and may be formed on the lower substrate 111 together with the pixel electrode PE in a horizontal electric field driving mode such as an in-plane switching (IPS) mode and a fringe field switching (FFS) mode. The liquid crystal display device of the present disclosure may be implemented in any liquid crystal mode as well as the TN mode, the VA mode, the IPS mode and the FFS mode.

A first polarizing plate 113 may be attached to the upper substrate 112 of the display panel 110, and a second polarizing plate 114 may be attached to the lower substrate 111. A light transmissive axis of the first polarizing plate 113 crosses or is orthogonal to that of the second polarizing plate 114. In this case, the first polarizing plate 113 may pass through the first linear polarized light ↕, and the second polarizing plate 114 may transmit the second linear polarized light ↔. Also, an alignment film for setting a pre-tilt angle of the liquid crystal may be formed on inner surfaces of the upper substrate 112 and the lower substrate 111, which are in contact with the liquid crystals.

The display panel 110 may be categorized into a display area where the pixels are formed to display an image and a non-display area where an image is not displayed. The gate lines, the data lines and the pixels may be formed on the display area. A gate driver and pads may be formed on the non-display area.

The gate driver supplies gate signals to the gate lines in accordance with a gate control signal input from the timing controller 160. The gate driver may be formed on the non-display area outside one side or both sides of the display area of the display panel 110 in a gate driver in panel (GIP) mode. Alternatively, the gate driver may be fabricated of a driving chip and packaged in a flexible film and attached to the non-display area outside one side or both sides of the display area of the display panel 110 in a tape automated bonding (TAB) mode.

The source drive IC 130 receives digital video data and a source control signal from the timing controller 160. The source drive IC 130 converts the digital video data to analog data voltages in accordance with the source control signal and supplies the analog data voltages to the data lines. If the source drive IC 130 is fabricated of a driving chip, the source drive IC 130 may be packaged in the flexible film 140 in a chip on film (COF) or chip on plastic (COP) mode.

Pads such as data pads may be formed on the non-display area of the display panel 110. Lines which connect the pads with the source drive IC 130 and lines which connect the pads with lines of the circuit board 150 may be formed in the flexible film 140. The flexible film 140 may be attached onto the pads by an anisotropic conducting film, whereby the pads may be connected with the lines of the flexible film 140.

The circuit board 150 may be attached to the flexible films 140. A plurality of circuits comprised of driving chips may be packaged in the circuit board 150. For example, the timing controller 160 may be packaged in the circuit board 150. The circuit board 150 may be a printed circuit board or a flexible printed circuit board.

The timing controller 160 receives digital video data and a timing signal from an external system board through a cable of the circuit board 150. The timing controller 160 generates a gate control signal for controlling an operation timing of the gate driver and a source control signal for controlling the source drive ICs 130 on the basis of the timing signal. The timing controller 160 supplies the gate control signal to the gate driver, and supplies the source control signal to the source drive ICs 130.

The backlight unit is arranged on a rear surface of the display panel 110, and irradiates uniform light to the rear surface of the display panel 110. The backlight unit may be realized in an edge type or a direct type. The edge type backlight unit has a structure that a plurality of optical sheets and a light guide plate area arranged below the display panel 110 and a plurality of light sources are arranged at a side of the light guide plate. The direct type backlight unit has a structure that a plurality of optical sheets and a diffusion plate are arranged below the display panel 110 and a plurality of light sources is arranged below the diffusion plate.

The backlight unit may include light sources, a light source circuit board in which the light sources are packaged, a light guide plate or diffusion plate, a reflective sheet, and optical sheets. The backlight unit converts light from the light sources to a uniform surface light source through the light guide plate or diffusion plate and the optical sheets, and irradiates light to the display panel 110.

Figure 8:
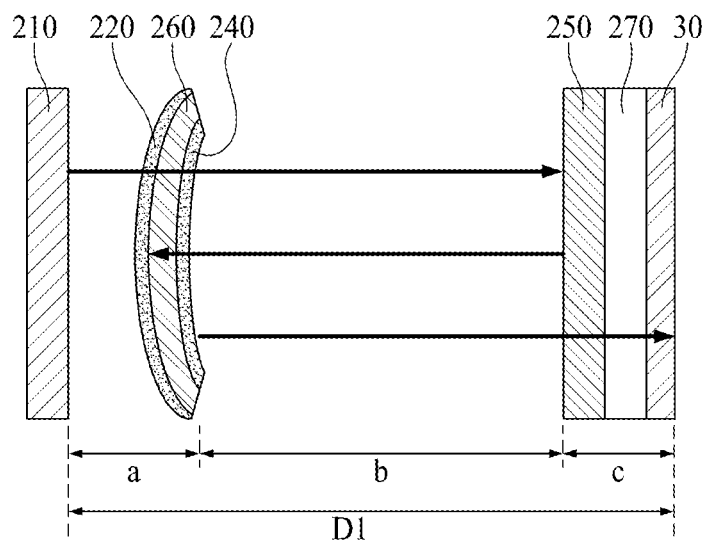
FIG. 8 is an exemplary view illustrating another example of the display module accommodating unit of FIGS. 2A and 2B.
Figure 9:
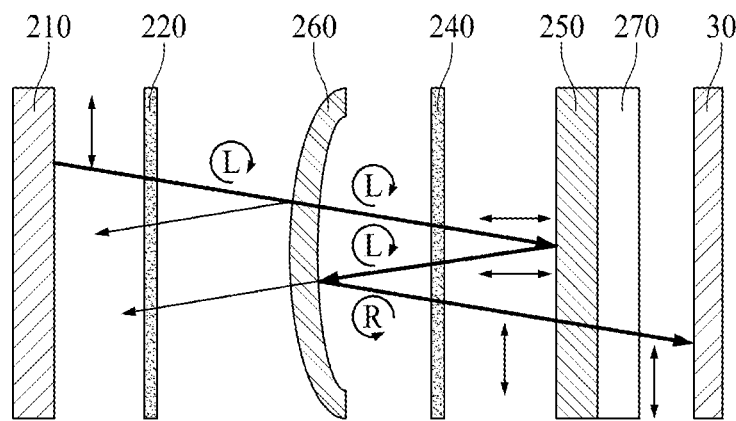
FIG. 9 is an exemplary view illustrating exploded elements of the display module accommodating unit of FIG. 8.

FIG. 8 is an exemplary view illustrating another example of the display module accommodating unit of FIGS. 2A and 2B. FIG. 9 is an exemplary view illustrating exploded elements of the display module accommodating unit of FIG. 8.

FIGS. 8 and 9 correspond to side views illustrating that the display module accommodating unit is viewed from one side. The first lens 30 and elements of the display module accommodating unit 20 for providing an image to the first lens 30 according to another aspect of the present disclosure are shown in FIGS. 8 and 9. Since the second lens 40 and elements of the display module accommodating unit 20 for providing an image to the second lens 40 according to another aspect of the present disclosure are substantially the same as those shown in FIGS. 8 and 9, their description will not be repeated.

Referring to FIGS. 8 and 9, the display module accommodating unit 20 includes 210, a first quarter wave (λ/4) plate 220, a meniscus lens 260, a second quarter wave plate 240, and a reflective polarizing plate 250.

Since the display module 210, the first quarter wave plate 220, the second quarter wave plate 240 and the reflective polarizing plate 250, which are shown in FIGS. 8 and 9, are substantially the same as those described with reference to FIGS. 3 and 4, their detailed description will be omitted.

The meniscus lens 260 is arranged between the first quarter wave plate 220 and the second quarter wave plate 240. The first quarter wave plate 220 may be attached to a first surface of the meniscus lens 260, and the second quarter wave plate 240 may be attached to a second surface of the meniscus lens 260. The first surface and the second surface of the meniscus lens 260 are convex in a direction of the first quarter wave plate 220.

The meniscus lens 260 may be a semi-transmissive plate that transmits a part of light and reflects the other part of light. The meniscus lens 260 is formed such that a curvature of a first surface facing the first quarter wave plate 220 (or to which the first quarter wave plate 220 is attached) is the same as that of a second surface facing the second quarter wave plate 240 (or to which the second quarter wave plate 240 is attached). For this reason, the meniscus lens 260 may not refract light when transmitting light, and may refract light when reflecting light. For example, the meniscus lens 260 may refract light by means of the curvature of the second surface when reflecting light as shown in FIG. 9. In this case, the first lens 30 does not need to be realized as a lens, such as a convex lens, which has a predetermined focal distance. That is, the first lens 30 may be formed of a plane lens or glass.

Figure 10:
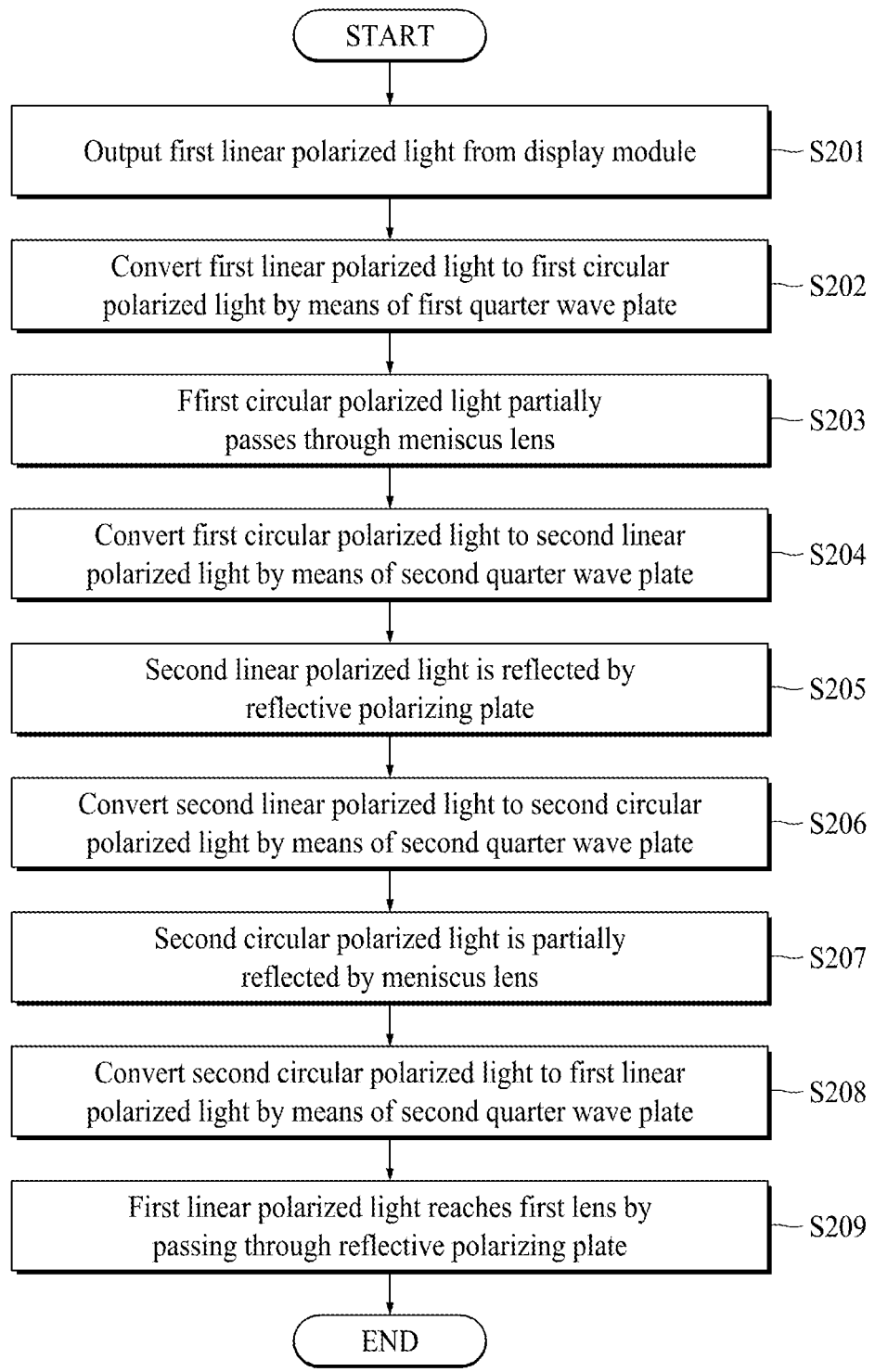
FIG. 10 is a flow chart illustrating a photo conversion procedure of the display module accommodating unit shown in FIG. 8.

FIG. 10 is a flow chart illustrating a photo conversion procedure of the display module accommodating unit shown in FIG. 8.

Hereinafter, the photo conversion procedure of the display module accommodating unit 20 will be described in detail with reference to FIGS. 9 and 10. Particularly, since the photo conversion procedure of the display module accommodating unit 20 is based on polarizing characteristic of light, the photo conversion procedure will be described based on the polarizing characteristic of light.

First, the first linear polarized light ↕ may be output from the display module 210. In FIGS. 9 and 10, it has been described that the first linear polarized light ↕ is vertical polarized light vibrated in a vertical direction (y-axis direction). The first linear light ↕ output from the display module 210 is headed for the first quarter wave plate 220. (S201 of FIG. 10)

Secondly, since the phase of the first linear polarized light ↕ output from the display module 210 is delayed by the first quarter wave plate 220 as much as λ/4, the first linear polarized light ↕ is converted to the first circular polarized light L. In FIGS. 9 and 10, it has been described that the first circular polarized light L is left circular polarized light. The first circular polarized light L converted by the first quarter wave plate 220 is headed for the meniscus lens 260. (S202 of FIG. 10)

Thirdly, since the meniscus lens 260 may transmit a part of light and reflect another part of light, the first circular polarized light L converted by the first quarter wave plate 220 partially passes through the meniscus lens 260. The first circular polarized light L that has passed through the meniscus lens 260 is headed for the second quarter wave plate 240. (S203 of FIG. 10)

Fourthly, since the phase of the first circular polarized light L that has passed through the meniscus lens 260 is delayed by the second quarter wave plate 240 as much as λ/4, the first circular polarized light L is converted to the second linear polarized light ↔. In FIGS. 9 and 10, it has been described that the second linear polarized light ↔ is horizontal polarized light vibrated in a horizontal direction (x-axis direction or z-axis direction). The second linear polarized light ↔ converted by the second quarter wave plate 240 is headed for the reflective polarizing plate 250. (S204 of FIG. 10)

Fifthly, since the reflective polarizing plate 250 passes through the first linear polarized light ↕ and reflects the second linear polarized light ↔, the second linear polarized light ↔ converted by the second quarter wave plate 240 is reflected by the reflective polarizing plate 250. Also, the second linear polarized light ↔ leaked from the reflective polarizing plate 250 without being reflected by the reflective polarizing plate 250 may be shielded by the polarizing plate 270. The second linear polarized light ↔ reflected by the reflective polarizing plate 250 is headed for the second quarter wave plate 240. (S205 of FIG. 10)

Sixthly, since the phase of the second linear polarized light ↔ reflected by the reflective polarizing plate 250 is delayed by the second quarter wave plate 240 as much as λ/4, the second linear polarized light ↔ is converted to the second circular polarized light R. In FIGS. 9 and 10, it has been described that the second circular polarized light R is right circular polarized light. The second circular polarized light R converted by the second quarter wave plate 240 is headed for the meniscus lens 260. (S206 of FIG. 10)

Seventhly, since the meniscus lens 260 may transmit a part of light and reflect another part of light, the second circular polarized light R converted by the second quarter wave plate 240 is partially reflected by the meniscus lens 260. The second circular polarized light R reflected by the meniscus lens 260 is headed for the second quarter wave plate 240.

The meniscus lens 260 may refract light by means of the curvature of the second surface when reflecting light as shown in FIG. 9. Therefore, the meniscus lens 260 may refract light to form a predetermined focal distance in accordance with the curvature of the second surface when reflecting light. In this case, the first lens 30 does not need to be realized as a lens, such as a convex lens, which has a predetermined focal distance. That is, the first lens 30 may be formed of a plane lens or glass. (S207 of FIG. 10)

Eighthly, since the phase of the second circular polarized light R reflected by the meniscus lens 260 is delayed by the second quarter wave plate 240 as much as λ/4, the second circular polarized light R is converted to the first linear polarized light ↕. The first linear polarized light ↕ converted by the second quarter wave plate 240 is headed for the reflective polarizing plate 250. (S208 of FIG. 10)

Ninthly, since the reflective polarizing plate 250 passes through the first linear polarized light ↕ and reflects the second linear polarized light ↔, the first linear polarized light ↕ converted by the second quarter wave plate 240 passes through the reflective polarizing plate 250. Also, since the polarizing plate 270 passes through the first linear polarized light ↕ and shields the second linear polarized light ↔, the first linear polarized light ↕ converted by the second quarter wave plate 240 passes through the polarizing plate 270. The first linear polarized light ↕ that has passed through the reflective polarizing plate 250 and the polarizing plate 270 may reach the first lens 30. Therefore, a user may view an image of the display module 210 through the first lens. (S209 of FIG. 10)

Supposing that the distance between the display module 210 and the second quarter wave plate 240 is "a", the distance between the second quarter wave plate 240 and the reflective polarizing plate 250 is "b" and the distance between the reflective polarizing plate 250 and the first lens 30 is "c", the distance from the display module 210 to the first lens 30 corresponds to "a+b+c" but a light path length until the image displayed on the display module 210 reaches the meniscus lens 260 having a predetermined focal distance may correspond to "a+2b". At this time, the distance from the display module 210 to the first lens 30 may be defined as a thickness D1 of the display module accommodating unit 20, and the distance 'b' between the second quarter wave plate 240 and the reflective polarizing plate 250 is longer than the distance 'c' between the reflective polarizing plate 250 and the first lens 30. That is, in the aspect of the present disclosure, the light path length until the image displayed on the display module 210 reaches the meniscus lens 260 having a predetermined focal distance may be longer than the thickness D1 of the display module accommodating unit 20. As a result, in the aspect of the present disclosure, even though the thickness D1 of the display module accommodating unit 20 is reduced, the light path length until the image displayed on the display module 210 reaches the meniscus lens 260 having a predetermined focal distance may be maintained as it is. Therefore, in the aspect of the present disclosure, the thickness D1 of the display module accommodating unit 20 may be reduced, whereby the thickness of the head mounted display may be reduced.

As described above, according to the present disclosure, the following advantages may be obtained.

In the aspect of the present disclosure, the light path length from the image displayed on the display module to the lens having a predetermined focal distance may be longer than the thickness of the display module accommodating unit. As a result, in the aspect of the present disclosure, even though the thickness of the display module accommodating unit is reduced, the light path length from the image displayed on the display module to the lens having a predetermined focal distance may be maintained as it is. Therefore, in the aspect of the present disclosure, the thickness of the display module accommodating unit may be reduced, whereby the thickness of the head mounted display may be reduced.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. Thus, the above aspects are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A head mounted display device comprising:
   a lens; and
   a display module accommodating unit providing an image to the lens,
   wherein the display module accommodating unit includes:
   a display module for displaying an image;
   a first quarter wave ($\lambda/4$) plate arranged between the display module and the lens, delaying a phase of incident light by $\lambda/4$;
   a second quarter wave plate arranged between the first quarter wave plate and the lens, delaying a phase of incident light by $\lambda/4$;
   a reflective polarizing plate arranged between the second quarter wave plate and the lens, passing through first linear polarized light and reflecting second linear polarized light crossing the first linear polarized light;
   a polarizing plate arranged between the reflective polarizing plate and the lens, passing through the first linear polarized light and shielding the second linear polarized light leaked from the reflective polarizing plate; and
   a semi-transmissive plate arranged between the first quarter wave plate and the second quarter wave plate.

2. The head mounted display device of claim 1, wherein the semi-transmissive plate includes a half mirror having a semi-transmissive conducting film transmitting a part of light and reflecting the other part of light.

3. The head mounted display device of claim 2, wherein the reflective polarizing plate is attached to one surface of the lens, and the other surface of the lens is formed of a convex lens or a Fresnel lens.

4. The head mounted display device of claim 1, wherein the semi-transmissive plate includes a meniscus lens transmitting a part of light and reflecting the other part of light.

5. The head mounted display device of claim 4, wherein the meniscus lens has a first surface facing the first quarter wave plate and a second surface facing the second quarter wave plate, and a curvature of the first surface is same as a curvature of the second surface.

6. The head mounted display device of claim 4, wherein the meniscus lens has a first surface facing the first quarter wave plate and a second surface facing the second quarter wave plate, and the first surface and the second surface of the meniscus lens are convex in a direction of the first quarter wave plate.

7. The head mounted display device of claim 1, wherein the reflective polarizing plate is attached to one surface of the lens facing the second quarter wave plate.

8. The head mounted display device of claim 1, wherein the display module includes:
   a display panel for displaying the image; and
   a first polarizing plate arranged on an upper substrate of the display panel.

9. The head mounted display device of claim 8, wherein the first polarizing plate passes through the first linear polarized light.

10. The head mounted display device of claim 9, further comprising a second polarizing plate arranged on a lower substrate of the display panel, wherein the second polarizing plate passes through the second linear polarized light.

11. The head mounted display device of claim 1, further comprising a polarizing plate arranged between the reflective polarizing plate and the lens, passing through the first linear polarized light and shielding the second linear polarized light.

12. A head mounted display device having a pair of lenses and a display module accommodating unit providing an image to the pair of lenses, comprising:
    a display module displaying an image and outputting first linear polarized light;
    a first quarter wave plate converting the first linear polarized light to first circular polarized light;
    a semi-transmissive plate passing through the first circular polarized light and partially reflecting second circular polarized light;
    a second quarter wave plate converting the first circular polarized light to second linear polarized light, converting the second linear polarized light to the second circular polarized light, and converting the second circular polarized light to the first linear polarized light;
    a reflective polarizing plate reflecting the second linear polarized light and passing through the first linear polarized light reaching to the pair of lenses; and
    a polarizing plate arranged between the reflective polarizing plate and the lens, passing through the first linear polarized light and shielding the second linear polarized light leaked from the reflective polarizing plate.

13. The head mounted display device of claim 12, wherein the semi-transmissive plate includes a half mirror having a semi-transmissive conducting film transmitting a part of light and reflecting the other part of light.

14. The head mounted display device of claim 12, wherein the reflective polarizing plate is attached to one surface of the lens, and the other surface of the lens is formed of a convex lens or a Fresnel lens.

15. The head mounted display device of claim 12, wherein the semi-transmissive plate includes a meniscus lens transmitting a part of light and reflecting the other part of light.

16. The head mounted display device of claim 15, wherein the meniscus lens has a first surface facing the first quarter wave plate and a second surface facing the second quarter wave plate, and a curvature of the first surface is the same as a curvature of the second surface.

17. The head mounted display device of claim 15, wherein the meniscus lens has a first surface facing the first quarter wave plate and a second surface facing the second quarter wave plate, and the first surface and the second surface of the meniscus lens are convex in a direction of the first quarter wave plate.

18. The head mounted display device of claim 12, wherein the reflective polarizing plate is attached to one surface of the lens facing the second quarter wave plate.

19. The head mounted display device of claim 12, wherein the display module includes a display panel for displaying the image and a first polarizing plate on an upper substrate of the display panel.

20. The head mounted display device of claim 19, further comprising a second polarizing plate on a lower substrate of the display panel, wherein the second polarizing plate passes through the second linear polarized light.

21. The head mounted display device of claim 12, further comprising a polarizing plate arranged between the reflective polarizing plate and the lens, passing through the first linear polarized light and shielding the second linear polarized light.

22. A head mounted display device having a pair of lenses and a display module accommodating unit providing an image to the pair of lenses, comprising:
- a display module for displaying an image and outputting first linear polarized light;
- a first quarter wave plate between the display module and the lens;
- a second quarter wave plate between the first quarter wave plate and the lens;
- a reflective polarizing plate between the second quarter wave plate and the lens, passing through first linear polarized light, and reflecting second linear polarized light crossing the first linear polarized light; and
- a semi-transmissive plate between the first quarter wave plate and the second quarter wave plate,
- wherein a distance between the display module and the first lens is a+b+c and an optical path length between the image displayed on the display module and the semi-transmissive plate is either a+2b or a+3b+c, where a is a distance between the display module and the second quarter wave plate, b is a distance between the second quarter wave plate and the reflective polarizing plate, c is a distance between the reflective polarizing plate and the first lens, and a+2b or a+3b+c is greater than a+b+c.

* * * * *